Oct. 11, 1955 — M. H. GRAHAM — 2,720,154
COFFEE MAKER
Filed Aug. 2, 1951 — 2 Sheets-Sheet 1

INVENTOR
MAURICE H. GRAHAM,
BY Parry Miller & Purrill
ATTORNEYS

Oct. 11, 1955 — M. H. GRAHAM — 2,720,154
COFFEE MAKER
Filed Aug. 2, 1951 — 2 Sheets-Sheet 2

INVENTOR
MAURICE H. GRAHAM,
BY Parry Miller & Purrill
ATTORNEYS

United States Patent Office 2,720,154
Patented Oct. 11, 1955

2,720,154

COFFEE MAKER

Maurice H. Graham, Hopkins, Minn.; Maurice W. Graham and Northwestern National Bank of Minneapolis, Hennepin County, Minn., executors of said Maurice H. Graham, deceased Application August 2, 1951, Serial No. 239,980

4 Claims. (Cl. 99—310)

This invention relates to coffee makers of the type wherein the liquid to be infused is repeatedly circulated through a bed of coffee grounds and it is particularly directed to such general type of coffee maker having an improved novel liquid circulating mechanism involving steam injection which is extremely simple and requires no moving parts.

One object of the invention is to effect coffee infusion while the main body of the liquid to be infused is below boiling temperature by repeatedly isolating small quantities of liquid obtained from such body, converting the same into steam under pressure and employing the steam in jet form to circulate liquid from the main body through coffee grounds.

Another object of the invention is to employ a single small orifice both as an inlet port for supplying liquid from the main body to be infused to a closed steam generating chamber and as a steam jet for injecting steam from such chamber back into the liquid body to effect circulation thereof through coffee grounds, the orifice being relatively fine and being identified as a pinhole orifice.

Another object of the invention is to circulate liquid to be infused by intermittently injecting steam from a steam generating chamber through a jet orifice into the liquid and between the steam discharges from such chamber to supply small quantities of such liquid through such orifice to the chamber for conversion into steam, the liquid being below maintained boiling temperature and immersing a substantial area of the steam generating chamber for heat exchange therewith. More specifically, it is proposed to locate a substantial area of the steam chamber containing the jet orifice in a body of the liquid to be circulated and to employ the cooling effect of such liquid on the chamber to promote the intake of liquid through the orifice into the steam chamber following each steam discharge.

Another object of the invention is to effect a continuous circulation of liquid to be infused through coffee grounds by intermittent steam injection.

An alternative object of the invention is to effect intermittent circulation of liquid to be infused through coffee grounds by intermittent steam injection.

Another object of the invention is to repeatedly circulate liquid to be infused through coffee by steam injection until infusion of the desired strength has been attained and to automatically terminate steam generation by a timing mechanism.

The invention will be understood readily by reference to the accompanying drawings and the detailed description to follow. In such drawings.

Figure 1:
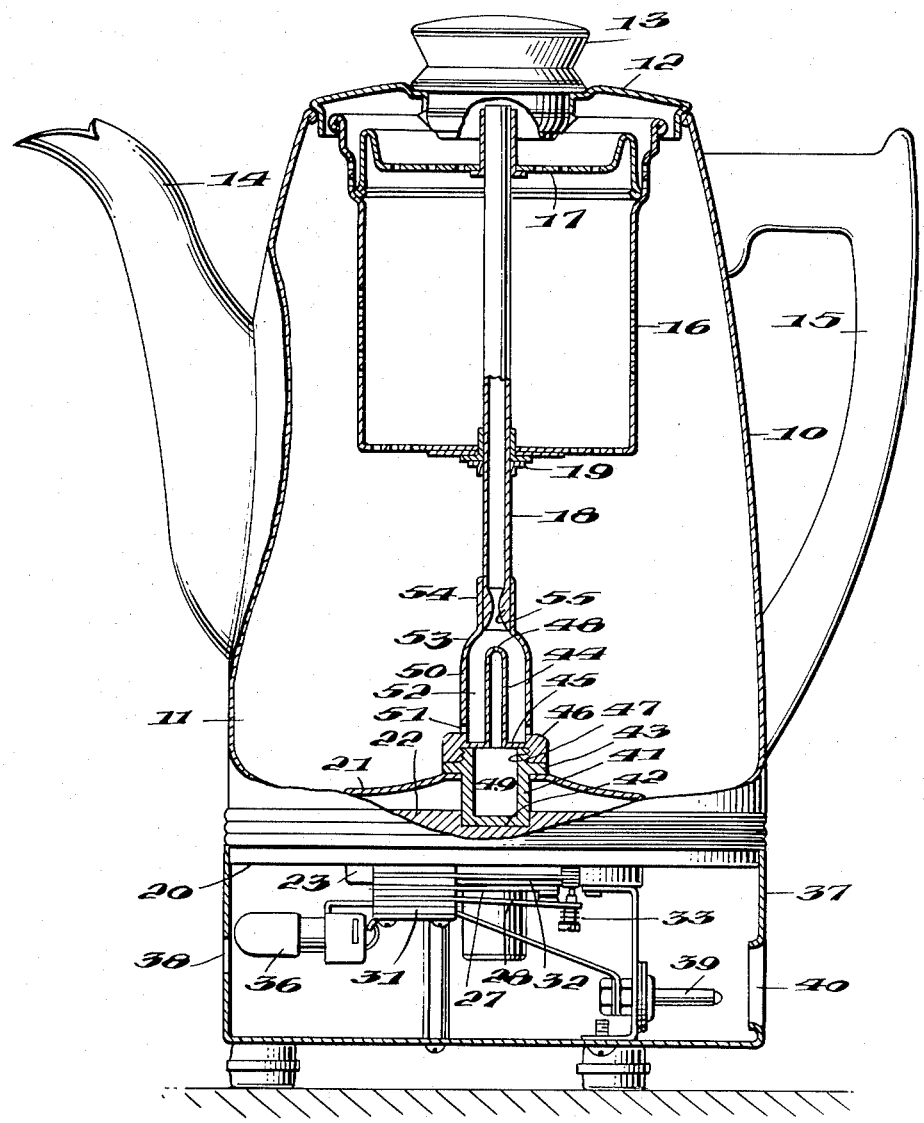
Fig. 1 is a side view, partly in elevation and partly in section, illustrating a coffee maker embodying my invention.
Figure 2:
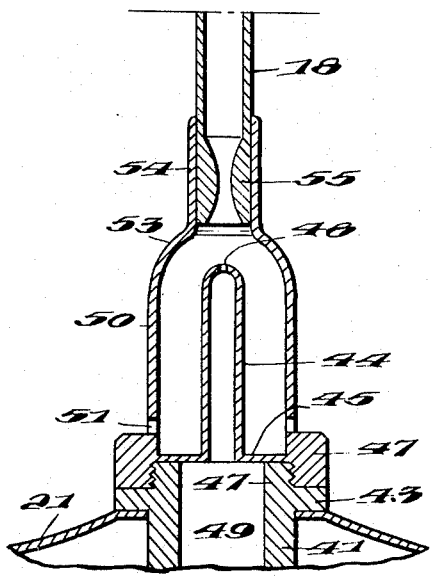
Fig. 2 is a fragmentary enlarged sectional elevation of the circulating mechanism shown in Fig. 1.
Figure 3:
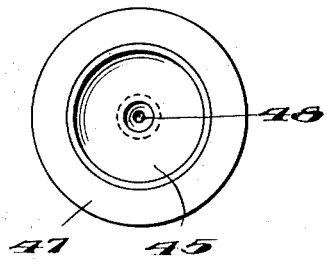
Fig. 3 is a bottom view of the upper portion of the circulating mechanism.

Referring first to the embodiment of Figs. 1 to 3 there is shown a coffee making vessel 10 which may be made in conventional form and composed of stainless steel or other metal or glass. Interiorly of the vessel is a chamber 11 for holding the liquid to be infused. A removable top 12 closes the upper end of the vessel. Secured centrally of the top is a hollow liquid spreading cap 13, preferably made of glass. A pouring spout 14 and handle 15 are provided on opposite sides of the vessel.

A perforate coffee holder 16 having a removable perforate top 17 is located in the upper portion of vessel 10 above the top level of the liquid in chamber 11. Extending upwardly through the coffee holder and upwardly into cap 13 is a fountain tube 18 for circulating liquid from chamber 10 through coffee in the coffee holder, from which it recirculates back to chamber 10. A flanged sleeve 19 secured to tube 18 provides a seat upon which the coffee holder is removably supported.

Figure 5:
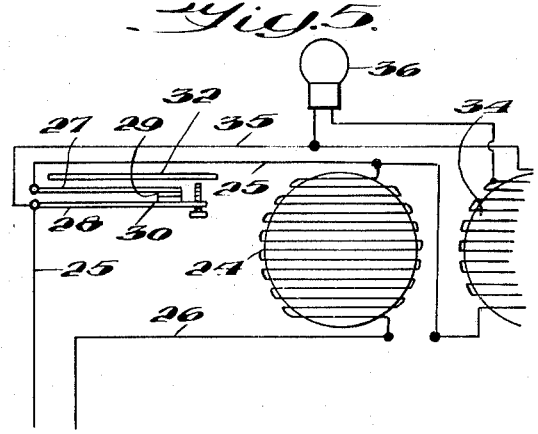
Fig. 5 is a diagrammatic view of the heating and control electric circuit.

The bottom of the vessel includes an annular portion 20 which surrounds a raised central bottom portion 21 which forms a hollow housing. Located in such housing is a metal heating plate 22, preferably of iron. A similar lower plate 23 is bolted to the upper plate, the same being shown projecting below the plane of annular bottom portion 20 in Fig. 1. Sandwiched between plates 22 and 23 and insulated therefrom by mica (not shown) is a flat heating element 24. As shown in Fig. 5 the same comprises a coil of electrical resistance wire wound on a flat disc of mica or other suitable insulating material. The heating element connects with electric lines 25 and 26. An automatic timing device is provided to terminate circulation of liquid at the end of a predetermined brewing period. This is of a thermostatic switch type. As shown in Figs. 1 and 5 the same comprises a pair of spring metal switch arms 27 and 28 having normally closed contacts 29 and 30 and supported by an insulating mounting 31 in the form of a series of washers. Such mounting is secured to the underside of annular vessel bottom portion 20. Secured by mounting 31 in spaced proximate relation to the bottom portion is a bimetal thermostatic arm 32 responsive to the heat of the liquid in chamber 10. An adjustable actuating screw 33 is threaded to an extension of switch arm 28. The bimetal arm is arranged to warp downwardly in response to heating and at a temperature determined by the setting of screw 33 will depress switch arm 28 and open switch contacts 29 and 30.

An electrical resistance element 34 is connected to electric line 25 and through line 35 to switch arm 27. The same is conveniently of the same wound disc form as heating element 24 and the same can be sandwiched between plates 22 and 23 with mica insulating it from the underside of the heating element. When switch contacts 29 and 30 are closed during the brewing period resistance 34 is shunted out of the circuit and full current is supplied to heating element 24. When the contacts are opened at the end of the brewing period by bimetal arm 32 resistance 34 is thrown in series with the heating element so that a lower amount of heat is supplied to keep the brew at a suitable drinking temperature sufficiently high to cause the bimetal arm to maintain the switch contacts open. The stand-by heating temperature will be sufficiently high to prevent resumed circulation of the brew through the coffee bed by the circulating mechanism hereafter to be described. If the arrangement were such that heating was discontinued at the end of the brewing period the bottom of the vessel and the brew would cool sufficiently to cause the bimetal arm to close the switch contacts, resulting in the supply of full current to the heating element. By way of example, the heating element 24 may be of 400 wattage and resistance 34 of an ohmage to reduce it to 65 wattage.

An electric signal light 36 is provided to indicate the end of the brewing period. The same can be supported by any suitable bracket beneath bottom portion 20 of the vessel. Such light and the thermostatic timing switch are mounted interiorly of a hollow vessel base 37. A viewing port 38 is provided in the side wall of the base. The signal light may comprise a low voltage lamp. The same may be connected in the circuit to be lighted during the brewing period and to cut off to signal the end of such period. Alternately, and as shown in Fig. 5, the light is connected so as to be inoperative during the brewing period and to flash on to signal the end of the brewing period. The same is shown in shunt with a few of the coils of electric resistance element 34 so as to be energized when the bimetal arm opens the switch contacts to throw the resistance element into circuit with heating element 24.

Also mounted in hollow base 37 are a pair of electric terminal pins 39, one of which is seen in Fig. 1. Such pins are supported by any suitable form of bracket. An opening 40 in the side of the base permits a conventional plug from an electric cord to be connected to the pins.

As previously explained, circulation of liquid to be infused through coffee grounds in holder 16 is effected by steam injection. A novel steam generating and injecting device is provided. The same includes a small metal lower well portion 41 seating in a recess 42 in the upper side of heating plate 22 and projecting upwardly into liquid chamber 11 through the top of raised central bottom portion 21 to which it is sealed in fluid-tight relation through a flange 43. A soldered joint may be provided.

A novel feature of the invention essential for proper operation consists in providing the steam generator with a portion of substantial surface area located in liquid chamber 11. In the embodiment shown the upper portion of the steam generator comprises a thin-walled metal tube 44 which extends substantially upwardly in chamber 11. Preferably such tube is of brass or other metal of good heat conductivity. The same will be entirely immersed by liquid in the chamber so that its side wall and upper end will be subjecting to cooling by the liquid. A flange 45 at the bottom of the tube is removably secured to well portion 41 by a securing nut 46 mounted on threaded upper end 47 of the well portion and seating against flange 43 in fluid-tight relation. The upper end of the tube is shaped as a nozzle having a relatively small orifice 48. Such orifice is of small pinhole dimensions. If a large orifice is provided proper intended operation is not obtained. An orifice in the range of 0.031" to 0.035" is preferred but it may vary beyond such limits.

Well portion 41 and tube 44 are so small that the interior chamber 49 which they form will accommodate only a small quantity of liquid at one time and allow a space above the liquid level in the tube adjacent orifice 48. Preferably only from a teaspoon to a tablespoon and perhaps only a few drops of liquid will be received and quickly converted into steam. The size of orifice 48 will determine the quantity of liquid. Such orifice constitutes a combined liquid inlet port for admitting liquid from the main body in chamber 11 into steam chamber 49 and a steam jet outlet from the chamber through which steam is injected into fountain tube 18 to effect liquid circulation.

It is important here to point out that it is a surprising novel feature of the invention that a pinhole orifice such as orifice 48 will admit liquid into the steam chamber in view of the steam generating heat constantly present. It will admit a small quantity at recurring intervals between which the liquid is generated into steam by the heat concentration on the bottom of well portion 41 embedded in heating plate 22. When sufficient steam pressure has been generated a jet of steam is discharged through orifice 48. This will be more fully explained hereafter.

Surrounding tube 44 of the steam generator is a perforate housing 50 of brass or any other suitable metal and having a series of liquid inlet ports 51 in its side wall through which liquid from chamber 11 is admitted into its annular chamber 52 surrounding tube 44. Such ports should be located below orifice 48 and preferably will all be located adjacent the bottom of tube 44 so that all liquid entering chamber 52 will circulate over substantially the entire area of the tube to better cool the tube. The housing has a curved dome 53 spaced above orifice 44. An integral sleeve 54 receives and is secured to the lower end of fountain tube 18. The lower end of the housing is secured to the upper side of securing nut 46. The size of housing and its annular chamber can vary within wide limits. It is important, however, that its dome be spaced sufficiently close to the upper end of tube 44 that a strong jet of steam can be discharged through orifice 48 into the fountain tube. I find, for example, that locating the lower end of the fountain tube ¼", or thereabouts, above the orifice produces satisfactory operation.

The tubular portion 44 of the steam generator may, for example, be of a length of 1 and ¼" with perforate housing 50 including its dome 53 of a height of 1½". Tube 44 may, for example, have an inside diameter of ⅜₆" or slightly larger. It should have a thin wall, of the order of 0.010" to 0.016" thickness for example, for cooling purposes. The perforate housing 50 should be larger enough in diameter than the tube that liquid of substantial annular thickness in the housing surrounds the tube. The well portion 41 of the steam generator may, for example, have a depth of ¾" and a diameter around ½".

The primary purpose of housing 50 is to support fountain tube 18. Other means may be substituted so long as provision is made to insure injection of steam, and with it liquid to be infused, into the fountain tube in a manner to cause circulation of the liquid to the coffee holder.

The operation will now be explained. Vessel 10 will be filled with water until the level therein stands not less than, say, about ¾" above the lower end of fountain tube. If the level is too low proper operation will not be obtained. Water from chamber 11 will enter perforate housing 50 through inlet ports 51 to immerse tubular portion 44 of the steam generator and stand at the same level in the fountain tube as in chamber 11. Electric current is then supplied to heating element 24.

Up to a temperature of about 160° F. temperature of the liquid in the main chamber and perforate housing no circulation of liquid up through the tube to the coffee holder is obtained. During the preliminary heat-up period, however, the steam generator intermittently sucks in water through orifice 48 which heats it above boiling and ejects it out again through the orifice at intervals starting at about ten seconds and becoming progressively shorter as the temperature rises. Because of the concentrated heat on the bottom of the relatively small well portion 44 of the generator and the small size of the orifice, the liquid is generated into steam under pressure of probably from one lb. to two lbs. and the steam discharges from the orifice with considerable force. The amount of pressure will depend on the size of the orifice and the amount of applied heat. Following each steam discharge the liquid in the perforate housing cools tube 44 of the generator because of its substantial lower temperature, creating a temporary slight vacuum in the tube which causes a small quantity of water to enter the tube through the orifice and flow down into the well portion of the generator. This in turn is generated into steam under pressure which discharges through the orifice. The intermittent liquid intake and steam discharge cycle continues. As the intervals between the steam discharges decrease and the temperature of the liquid rises there is less cooling effect on the generator tube. As a result less vacuum is probably produced in the tube so that the quantity of water entering the generator and converted into steam apparently decreases. However, below the temperature referred to, the temperature of the liquid surrounding tube 44 is sufficiently low to quickly condense steam and there is insufficient force to cause liquid in chamber 10 to be circulated up through fountain tube 18 into the coffee holder.

Circulation of liquid will begin at or somewhat below 160° F. By this time the steam generator discharges steam through the orifice at about ½ second intervals with liquid entry and generation into steam between times. The jets of steam enter the fountain tube and their injection into the liquid causes the liquid to be forced up through the tube to a fountain in cap 13 from whence it flows down through the coffee bed and coffee holder by gravity and after infusion flows back into chamber 10. The increased temperature of the liquid enables the steam to enter the fountain tube without condensation by liquid. The steam does condense somewhere in the tube and heats the liquid in the tube so that it is delivered to the coffee holder at a temperature in the range of 180° to 195° F.

By the time the temperature of the liquid increases into the range of 180° to 190° F., the temperature differential between the liquid and the steam generator has so decreased that there is little cooling effect and insufficient, if any, vacuum is produced in the generator tube to cause liquid to enter the generator through the orifice. With no further generation of steam circulation would stop from steam failure. However, the thermostatic timing switch is preferably adjusted to open and reduce the heating effect of the heating element and heating plate when the liquid reaches a temperature say about 185° F., about or below that at which steam failure may occur so as to avoid possible injury to the steam generator parts by the heat used during steam generation.

It will be understood that the liquid in chamber 11 must be heated sufficiently slowly by controlled applied heat that sufficient time is allowed for repeated circulation by steam in the manner explained through the coffee holder that a brew of proper strength is obtained. The heating means employed must be such as to heat the liquid in the chamber gradually while intensely heating the steam generator. The particular heating unit previously described is merely illustration. Other single, or separate, heating units for the chamber and generator may be employed, likewise other thermostatic timers and electric circuits.

An important further feature of the invention is that while jets of steam are delivered from the steam generator intermittently, I can obtain continuous delivery of liquid through the fountain tube for infusion in the coffee holder. This I accomplish by making the fountain tube in whole or in part of substantially smaller interior diameter than is conventional. It may have a restricted bore of, say, around ⅛" for its entire length or it may be provided with a local restriction at or adjacent its lower end. The latter arrangement is shown in Figs. 1 and 3. A venturi 55 is provided at the lower end of the fountain tube sufficiently close to the orifice of the steam generator that steam jets enter the venturi with considerable force during the normal liquid circulating period. The bore of the venturi at its smallest point will be smaller than where the tube is of small diameter throughout its length but should be considerably larger than the size of the orifice to insure adequate circulation of liquid with the steam through the venturi. With an orifice of the size previously referred to I used a bolt having a minimum bore of 0.108" with very satisfactory results. The diameter of the fountain tube above the venturi was in some instances ³⁄₁₆" and in other instances ¼", both of which sizes are conventional.

It now appears that the continuous circulation of liquid through the fountain tube to the coffee holder is due to the dampening or flow retarding effects of the venturi on the jets of steam on the circulated liquid, also on the relatively short ½ second intervals, or thereabouts, between successive discharges of steam from the generator. Because of the retardation of flow the liquid in chamber 10 surrounding the fountain tube at and immediately above the venturi probably causes the steam to condense and lose its force immediately above, and perhaps starting in the venturi. In any event a relatively smooth flow of liquid is discharged from the upper end of the tube.

Where a fountain tube is of restricted diameter throughout its length or throughout any substantial portion thereof, a similar flow retarding action would be obtained. In either construction the degree of flow restriction provided by the fountain tube must be determined liquid circulating capacity of the steam operator.

The invention as described produces adequate repeated circulation of liquid from chamber 10 through the coffee bed in the coffee holder to provide a brew of any normal strength as the liquid rises in temperature from around 160° to around 180° to 190° F. and before the steam generator would become inoperative to further generate steam. Adjustment of screw actuator 33 of the thermostatic timing switch will determine the temperature at which the thermostatic arm 32 opens the switch, the length of the overall heating period and the length of the circulating period which follows initial heating. The brew obtained is of excellent taste since infusing the liquid at below boiling temperature avoids extraction from coffee of various bitter taste components which are extracted when the liquid is infused at boiling temperature. Because of the small size of orifice 44 it is not likely that even fine coffee grounds carried into chamber 10 from the coffee holder will enter the steam generator. If they should they will be trapped in the generator and only vaporized steam will discharge from the generator. The steam chamber can be opened for cleaning by unscrewing nut 47.

Figure 4:
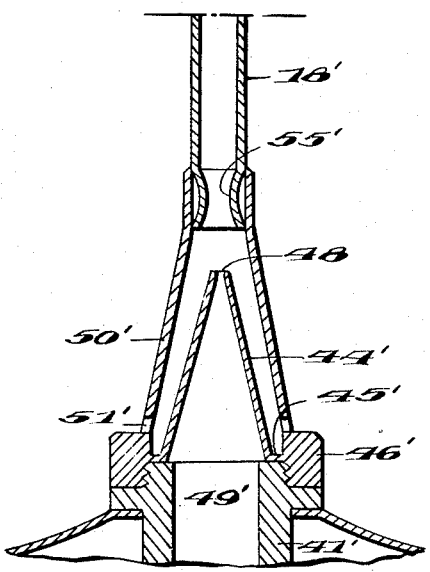
Fig. 4 is a view similar to Fig. 2 of a modified embodiment of the circulating mechanism.

The embodiment of the invention shown in Fig. 4 is similar in operating principle to that already described. The vessel and other parts not shown can be the same as those in Figs. 1 and 5. The steam generator includes lower well portion 41' which is subject to intense heating by a heating element and plate (not shown) as previously described. The upper portion 44 of the steam generator is of conical form. At its base it has substantially the same diameter as the well portion and it tapers upwardly to a small nozzle end. Bottom flange 45' is secured, as by soldering, to a securing nut 46' which is removably threaded in fluid-tight relation on the upper end of the well portion. The nozzle end is provided with a pinhole orifice 48' within the range previously given and preferably is about 0.031". The entire conical upper portion is immersed in the liquid to be circulated and projects upwardly to a height sufficient to locate orifice 48 well above the highly heated bottom (not shown) of the well portion. In a height of an inch or more is desirable. The conical portion should have a thin wall and preferably be made of brass or other highly heat conducting metal.

The overall size of steam chamber 49' formed by portions 41' and 44' is considerably larger than in the previous embodiment and this makes clear the point that while the generator should be comparatively small, particularly in diameter, to insure rapid generation of steam its size is not critical. The quantity of liquid entering the steam chamber through orifice 48' and generated into steam is determined primarily by the size of the orifice and the cooling effect on the conical portion 44' by the surrounding liquid.

Surrounding conical portion 44' is a perforate housing

50'. This also is made conical. Liquid inlet ports 51' in the housing admit water from the main chamber. By locating such ports near the bottom of the housing, during circulation there is a flow of liquid upwardly through annular chamber 52' over substantially the entire length of the conical portion of the generator. Because of such flow and the substantial surface area of the conical portion of the generator, a very satisfactory cooling effect on the generator is obtained to reduce the pressure in the steam chamber quickly after each intermittent discharge of steam and cause a small quantity of liquid again to be sucked into the steam chamber for conversion into steam. The increased cooling effect of flowing liquid is also obtained in the embodiment previously described. However, if the tubular upper portion 44 of the steam generator thereof is made too short in length or too small in outside diameter to provide sufficient wall surface for adequate cooling satisfactory steam generation and circulation in the intended manner may not always be obtained or may be erratic.

To insure continuous circulation of liquid with intermittent bursts of steam from the steam generator under the temperature conditions and approximately the same intervals previously described, a restricted bore is also provided in fountain tube 18' in the form of a venturi 55' formed by contracting the wall of the fountain tube near its lower end about ¼" above the orifice of the steam generator. This may be found preferable in many cases since the lesser thickness of the wall of the venturi than in the embodiment shown in Figs. 1 and 2 increases the cooling effect of the surrounding liquid on the steam as it passes through the venturi to promote condensation thereof and insure delivery of liquid through the top of the fountain tube in a continuous flow. The operation of the present embodiment is the same as that in the previous embodiment and will be understood from the description previously given.

While I prefer to provide continuous circulation of liquid to be infused through the grounds in the coffee maker this is not essential to satisfactory infusion. It is also within the scope of the invention to circulate the liquid intermittently by the intermittent bursts of steam from the steam chamber. The steam generator can be constructed to function as before. Since continuous flow is produced by restriction of flow in the fountain tube intermittent flow of liquid for infusion can be obtained merely by employing a fountain tube of sufficiently large interior diameter throughout its length that the steam and liquid injected into the tube flow upwardly through the tube without substantial restriction under the force of the steam. Since the bursts of steam are of very short duration, only a limited quantity of liquid is delivered to the coffee holder through the tube with each burst. However, because of the lack of restriction the rate of flow through the tube is more rapid and it has been found that substantially the same total volume of liquid can be circulated through the coffee holder during brewing period and a brew of equal strength obtained as with the embodiments which provided continuous liquid circulation.

It will be understood that the embodiments of the invention which have been described are merely illustrative. The construction and dimensions of the steam generator and associating parts can be varied considerably within the scope of the inventions and glass in place of metal parts may be employed wherever possible. The invention is novel in construction and operating principle and differs materially from prior devices, such as those of my prior Patent No. 2,175,727, granted October 10, 1939, wherein externally located chambers are employed for heating the fluid which circulates the liquid to be brewed. Accordingly, the scope of the invention is to be determined from the appended claims.

I claim:

1. A coffee maker comprising a vessel, a chamber in the vessel for liquid to be infused, a coffee holder mounted in the vessel above the normal liquid level in said liquid chamber adapted to receive liquid from said liquid chamber and return the liquid after infusion to said chamber, a tube in said chamber for conducting liquid from said chamber to the coffee holder, a small steam generating chamber separate from the liquid chamber and having closed bottom and side walls adapted to quickly convert liquid in small quantity into steam by the application of heat thereto comprising a portion projecting into the liquid chamber, said steam generating chamber portion being immersed in liquid to be infused and comprising a relatively thin wall for rapid heat conduction between said steam generating chamber portion and the relatively cooler surrounding liquid, a pin-hole orifice in said steam generating chamber portion directed in line with the tube, said pin-hole orifice being adapted to intermittently deliver small quantities of liquid from the liquid chamber to the steam generating chamber for conversion into steam and adapted to intermittently inject steam under pressure from the steam generating chamber into the tube for circulating liquid from the liquid chamber to the coffee holder.

2. In a recirculating coffeemaker having a chamber for a main body of infusing liquid, a holder for ground coffee provided with openings for circulation of infusing liquid therethrough and return of the same to the main body of liquid, and a fountain tube in said chamber for conveying liquid from the main body to the said holder, means for circulating the infusing liquid through the fountain tube and said coffee holder comprising a steam generator having a heat receiving well or boiler portion extending outside the said chamber and an elongated thin walled liquid feeding and steam ejecting nozzle portion located within the chamber, said elongated thin walled nozzle portion being immersed in said main body of infusing liquid, and provided with a small orifice for discharging steam into the fountain tube, and said thin walled nozzle portion affording rapid heat exchange between the generator and the cooler body of surrounding infusing liquid, whereby condensation and partial evacuation quickly occur in the steam generator to suck in a new amount of liquid promptly upon discharge of steam through the said small orifice and a succession of liquid impulses to the holder is established, said generator being closed to steam egress except for said small orifice.

3. In a coffee maker having a chamber for a body of liquid, means for circulating said liquid for infusion comprising a tube in said chamber for conducting said liquid, a small steam generating chamber separated from said body of liquid adapted to quickly convert liquid in small quantity into steam by the application of heat thereto comprising a portion projecting into said body of liquid, said steam generating chamber portion being immersed in liquid to be infused and comprising a relatively thin wall of the order of 0.10" to 0.016" thickness for rapid heat conduction between said steam generating chamber portion and the relatively cooler surrounding liquid, said steam generating chamber portion having a pin hole orifice of the order of 0.031" to 0.035" diameter closely spaced adjacent one end of the tube and directed in line therewith, said pin hole orifice being adapted to alternately receive small quantities of liquid from said body of liquid to the steam generating chamber for conversion into steam and inject steam under pressure from the steam generating chamber into the tube for circulating liquid from said body of liquid.

4. In a recirculating coffee maker having a chamber for a main body of infusing liquid, a holder for ground coffee provided with openings for circulation of infusing liquid therethrough and return of the same to the main body of liquid, and a fountain tube provided with a venturi in said chamber for conveying liquid from the main body to the said holder, means for circulating the infusing liquid through the fountain tube and said coffee holder comprising a steam generator having a heat receiving well or boiler portion extending outside the said chamber and an elongated thin walled steam tube portion immersed in said main body of infusing liquid and provided with a pin hole orifice closely spaced adjacent one end of the fountain tube and directly in line therewith for discharging steam into said fountain tube, said generator thin walled steam tube portion being alternately for ingress of liquid and for egress of steam, and a housing or hood immersed in the infusing liquid to guide currents of inflowing infusing liquid to wash against the sides of said steam tube portion before entering the same, said generator being closed to steam egress except for said pin hole opening and said thin walled portion affording rapid heat exchange between the generator and the cooler body of surrounding infusing liquid, whereby condensation and partial evacuation occurs quickly in the steam generator to suck in a new amount of liquid promptly upon discharge of steam through the pin hole orifice, and a succession of liquid impulses to the holder is established.

References Cited in the file of this patent

UNITED STATES PATENTS

| | | |
|---|---|---|
| 133,582 | Hofman | Dec. 3, 1872 |
| 520,039 | Dunlap | May 22, 1894 |
| 868,187 | Ives | Oct. 15, 1907 |
| 906,629 | Holley | Dec. 15, 1908 |
| 997,845 | Omara | July 11, 1911 |
| 1,059,049 | Johnson | Apr. 15, 1913 |
| 1,276,774 | Kuhn et al. | Aug. 27, 1918 |
| 1,297,425 | Wentorf | Mar. 18, 1919 |
| 1,452,256 | Rowley | Apr. 17, 1923 |
| 1,492,160 | Colby | Apr. 29, 1924 |
| 1,824,763 | Bridgham | Sept. 29, 1931 |
| 2,025,302 | Olds | Dec. 24, 1935 |
| 2,175,727 | Graham | Oct. 10, 1939 |
| 2,287,580 | Wagner | June 23, 1942 |
| 2,385,132 | Graham | Sept. 18, 1945 |